United States Patent
Jin et al.

(10) Patent No.: US 11,480,702 B2
(45) Date of Patent: Oct. 25, 2022

(54) ULTRASONIC TRANSDUCER WITH REDUCED BACKING REFLECTION

(71) Applicant: Halliburton Energy Services, Inc., Houston, TX (US)

(72) Inventors: Jing Jin, Singapore (SG); Yao Ge, Singapore (SG); Wei Li, Singpore (SG); Xiang Wu, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 763 days.

(21) Appl. No.: 16/463,689

(22) PCT Filed: Jun. 27, 2018

(86) PCT No.: PCT/US2018/039724
§ 371 (c)(1),
(2) Date: May 23, 2019

(87) PCT Pub. No.: WO2020/005226
PCT Pub. Date: Jan. 2, 2020

(65) Prior Publication Data
US 2021/0103069 A1 Apr. 8, 2021

(51) Int. Cl.
*G01V 1/50* (2006.01)
*E21B 47/085* (2012.01)
(Continued)

(52) U.S. Cl.
CPC ............. *G01V 1/50* (2013.01); *B06B 1/0685* (2013.01); *E21B 47/0025* (2020.05); *E21B 47/085* (2020.05); *G01V 1/159* (2013.01); *G01V 1/186* (2013.01); *B06B 2201/55* (2013.01); *B06B 2201/73* (2013.01); *G01V 2200/16* (2013.01); *G01V 2210/1299* (2013.01); *G01V 2210/1427* (2013.01); *G01V 2210/60* (2013.01)

(58) Field of Classification Search
CPC ........ G01V 1/50; G01V 1/159; E21B 47/085; E21B 47/0025
See application file for complete search history.

(56) References Cited

U.S. PATENT DOCUMENTS

| 3,359,537 A | 12/1967 | Geil et al. |
| 4,523,122 A | 6/1985 | Tone et al. |

(Continued)

OTHER PUBLICATIONS

"QBAT Multipole LWD Sonic Service", Retrieved from internet:https://web.archive.org/web/20171201013128/http://www.halliburton.com/en-US/ps/sperry/drilling/logging-while-drilling/acoustic/qbat-multipole-lwd-sonic-tool.page, Dec. 2017, 1 page.

(Continued)

*Primary Examiner* — Albert K Wong
(74) *Attorney, Agent, or Firm* — Kilpatrick Townsend & Stockton LLP (57) ABSTRACT

A well tool can be used in a wellbore that can measure characteristics of an object in the wellbore. The well tool includes an ultrasonic transducer for generating an ultrasonic wave in a medium of the wellbore. The ultrasonic transducer includes a front layer, a rear layer, backing material coupled to the rear layer, and piezoelectric material coupled to the front layer and to the backing material. The rear layer can improve signal-to-noise ratio of the transducer in applications such as imaging and caliper applications.

18 Claims, 5 Drawing Sheets

(51) Int. Cl.
*B06B 1/06* (2006.01)
*E21B 47/002* (2012.01)
*G01V 1/02* (2006.01)
*G01V 1/18* (2006.01)

(56) References Cited

U.S. PATENT DOCUMENTS

| | | | |
|---|---|---|---|
| 5,553,035 | A | 9/1996 | Seyed-bolorforosh et al. |
| 6,936,009 | B2 * | 8/2005 | Venkataramani ...... G10K 11/02 29/25.35 |
| 7,281,428 | B2 * | 10/2007 | Kim ................... G01N 29/4418 356/482 |
| 7,808,156 | B2 * | 10/2010 | Chaggares ........... A61B 8/4444 310/334 |
| 8,164,982 | B2 * | 4/2012 | Okuda .................... G01S 3/808 367/173 |
| 9,050,628 | B2 * | 6/2015 | Lautzenhiser ........ E21B 47/107 |
| 10,465,507 | B2 * | 11/2019 | McRory .................. E21B 47/16 |
| 2005/0002276 | A1 | 1/2005 | Yogeswaren |
| 2013/0085396 | A1 | 4/2013 | Isono et al. |
| 2013/0200756 | A1 | 8/2013 | Maki, Jr. |
| 2016/0016199 | A1 | 1/2016 | Goodman et al. |

OTHER PUBLICATIONS

"XBAT Azimuthal Sonic and Ultrasonic LWD Service", Retrieved from Internet: http://www.halliburton.com/en-US/ps/sperry/drilling/logging-while-drilling/acoustic/XBAT.page, Dec. 2017, 1 page.
PCT Application No. PCT/US2018/039724 , "International Search Report and Written Opinion", dated Mar. 27, 2019, 12 pages.

* cited by examiner

FIG. 6 though the backing material is long enough and has sufficient attenuation coefficient, the ultrasound signals reaching the bottom of the backing material and being reflected back to the piezoelectric material may be negligible and may not interfere with the desired signal received from the front surface of the piezoelectric material.

ULTRASONIC TRANSDUCER WITH REDUCED BACKING REFLECTION

TECHNICAL FIELD

The present disclosure relates to devices usable in a wellbore for measuring a characteristic of a wellbore. More specifically, this disclosure relates to an ultrasonic transducer that reduces backing reflection in an environment of a wellbore.

BACKGROUND

In oilfield services operations, transducers can be used for imaging or ultrasonic caliper operations in muds or other substances, among other uses. Mud or other substances can cause high attenuation in the ultrasonic signals from the transducers, making the use of transducers challenging to obtain accurate and consistent data. Self-ultrasonic noises of a transducer can also inhibit the performance of the transducer. A high signal-to-noise ratio in signal processing can help overcome signal attenuation and transducer noise, particularly in applications in a downhole environment.

DETAILED DESCRIPTION

Certain aspects and examples of the disclosure relate to an ultrasonic, piezoelectric ultrasonic transducer that includes a layer having a selected thickness positioned behind backing material of the ultrasonic transducer to reduce the reflection from the end of the backing material for applications in a wellbore. This can enhance signal-to-noise ratio (SNR) of the transducer for applications such as high-quality imaging and caliper operations downhole.

In one example, an ultrasonic transducer includes a front layer and a rear layer. Positioned between the front layer and the rear layer is backing material and piezoelectric material. The backing material is positioned adjacent to the rear layer and the piezoelectric material is positioned between the backing material and the front layer. Each of the front layer and the rear layer can have a selected thickness and, in some examples, be a quarter wavelength, respectively, to the sound of velocity of the respective material of the front layer and the rear layer. In some examples, the ultrasonic transducer can transmit and receive ultrasonic signals and refracted or reflected signals. In other examples, the ultrasonic transducer can transmit ultrasonic signals and a separate sensor is used to receive the refracted or reflected signals.

An ultrasonic transducer according to some examples can be used in borehole imaging to enable high SNR imaging and caliper applications in Logging While Drilling (LWD), and wireline. The piezoelectric material can convert electrical energy into mechanical energy. The front layer can be a plate that can be attached to the front surface of the piezoelectric material and configured to match the ultrasonic impedance of the piezoelectric material to the ultrasonic impedance of the medium in which ultrasound signals propagate and is utilized for detection or imaging. The backing material can be attached to the rear surface of the piezoelectric material to absorb the ultrasound signals emitted from the rear surface of the piezoelectric material. As long as the backing material is long enough and has sufficient attenuation coefficient, the ultrasound signals reaching the bottom of the backing material and being reflected back to the piezoelectric material may be negligible and may not interfere with the desired signal received from the front surface of the piezoelectric material.

But, in downhole application the medium is usually mud, with high attenuation to ultrasound signals. The desired signal received from the front surface of the piezoelectric material may be small in amplitude. Furthermore, as a downhole device, the transducer may have limited dimension, and the backing material may not be as long as needed to attenuate enough of the ultrasound before it is reflected back to the rear surface of the piezoelectric material from the bottom surface of the backing material.

Rather than the backing material being the sole material behind the piezoelectric material to absorb the ultrasounds emitted from the real surface of the piezoelectric material, an additional layer—the rear layer having the selected thickness is attached to the end of the backing material to reduce the reflection from the end of the backing material. For transducers of a small size, in which the backing material may not be long enough to attenuate enough of the ultrasound signals, the rear layer can improve signal attenuation.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

Figure 1:
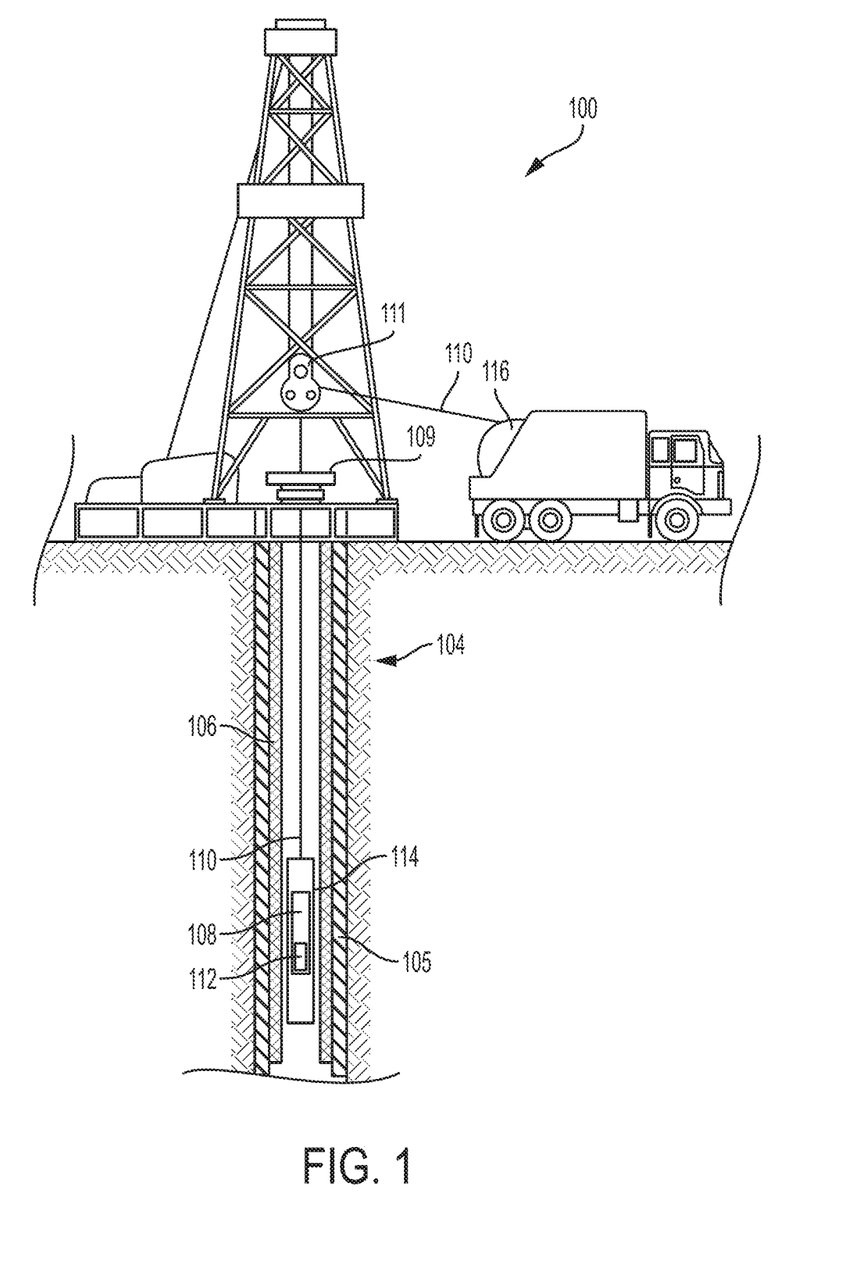
FIG. 1 is a cross-sectional view of an example of a well system that includes a downhole piezoelectric ultrasonic transducer according to some aspects of the present disclosure.

FIG. 1 is a cross-sectional view of an example of a well system 100 that includes a downhole piezoelectric ultrasonic transducer according to some aspects. The well system 100 includes a wellbore extending through various earth strata. The wellbore extends through a hydrocarbon bearing subterranean formation 104. A casing string 106 extends from the surface 109 to the subterranean formation 104. The casing string 106 can provide a conduit through which formation fluids, such as production fluids produced from the subterranean formation 104, can travel from the wellbore to the surface 109. The casing string 106 can be coupled to the walls of the wellbore via cement. For example, a cement sheath 105 can be positioned or formed between the casing string 106 and the walls of the wellbore for coupling the casing string 106 to the wellbore.

The well system 100 can also include at least one well tool 114 (e.g., a formation-testing tool). The well tool 114 can be coupled to a conveyance 110, (e.g., wireline, slickline, or coiled tubing, etc.) that can be deployed into the wellbore. The conveyance 110 can be guided into the wellbore using, for example, a guide 111 or winch. In some examples, the conveyance 110 can be wound around a reel 116.

The well system 100 can include an ultrasonic sensing system 108. The ultrasonic sensing system 108 can include an ultrasonic transducer 112 for transmitting ultrasonic waves. The ultrasonic transducer 112 can include at least one rear layer attached to backing material, which is attached to piezoelectric material, which is attached to a front layer. The components of the ultrasonic transducer 112 can be bonded together using an epoxy.

In some examples, the ultrasonic sensing system 108 can transmit an electrical signal to the ultrasonic transducer 112 to generate ultrasonic waves. In some examples, the ultrasonic waves can include a frequency that is 20 kHz and above. The electrical signal can cause the ultrasonic transducer 112 to vibrate. The vibration of the ultrasonic transducer 112 can mechanically generate ultrasonic waves (e.g., pressure waves) in a medium in which the ultrasonic transducer 112 is positioned. The medium can include a gas or a liquid, such as oil, water, or mud. The ultrasonic waves can propagate through the medium and reflect or refract off one or more features of the wellbore. For example, the ultrasonic waves can reflect off the subterranean formation 104, the casing string 106, the cement sheath 105, or any combination of these.

In some examples, the ultrasonic sensing system 108 can detect the reflected or refracted ultrasonic waves (e.g., by using the same transducer, or using another sensor, such as a microphone or a hydrophone') and analyze one or more characteristics of the reflected ultrasonic waves. The ultrasonic sensing system 108 can determine one or more characteristics of the wellbore based on the characteristics of the reflected ultrasonic waves. For example, the ultrasonic sensing system 108 can compare a time in which the ultrasonic sensing system 108 transmitted an ultrasonic wave to another time in which the ultrasonic sensing system 108 detected a reflection of the ultrasonic wave or a refraction of the ultrasonic wave to determine a difference between the times. In some examples, the ultrasonic sensing system 108 can determine a location, type, sound velocity, or material of an object in the wellbore based on the difference. For example, the ultrasonic sensing system 108 can determine that the object is a portion of a wall of the wellbore, that the object is located a particular distance from the ultrasonic sensing system 108 or the well tool 114, that the object includes a particular material, or any combination of these. The analyzed signals can also be used for imagining or caliper applications. For example, the characteristic of an object can include a measured diameter of part of the wellbore determined by a caliper application, an impedance of borehole material, or an existence of a deformity of a wall of the borehole wall, such as fractures In some examples, the ultrasonic sensing system 108 can include multiple ultrasonic receivers for detecting reflected or refracted ultrasonic waves. For example, the ultrasonic sensing system 108 can include an array of ultrasonic transducers 112 configured for detecting reflected or refracted ultrasonic waves. In some examples, the ultrasonic sensing system 108 can use at least two of the ultrasonic receivers to detect reflected or refracted ultrasonic waves.

The ultrasonic sensing system 108 can determine one or more characteristics of the object in the wellbore based on one or more characteristics of the reflected or refracted ultrasonic waves.

For example, the ultrasonic sensing system 108 can emit an ultrasonic wave that can propagate through the wellbore and reflect or refract off an object in the wellbore. Two or more of the ultrasonic receivers can detect the reflection or refraction of the ultrasonic wave. In some examples, the two or more ultrasonic receivers can be positioned to detect the reflection or refraction of the ultrasonic wave at different times. The ultrasonic sensing system 108 can determine a characteristic of the object by analyzing the different times at which the ultrasonic receivers detected the reflection or refraction. For example, the ultrasonic sensing system 108 can determine a pattern associated with the different times. The pattern can be indicative of the object including a particular characteristic. The ultrasonic sensing system 108 can determine that the object includes the characteristic based on the presence of the pattern.

The ultrasonic sensing system 108 can additionally or alternatively determine other characteristics of an object in the wellbore, e.g., using any of the methods described above. For example, the ultrasonic sensing system 108 can determine a sound velocity that is characteristic of the object, a porosity of the object, a fracture characteristic of the object (e.g., whether the object includes a fracture), a material composition of the object, a texture of the object, or any combination of these. The ultrasonic sensing system 108 can determine any of these characteristics based on one or more parameters of one or more reflected or refracted ultrasonic waves detected by one or more ultrasonic receivers.

Figure 2:
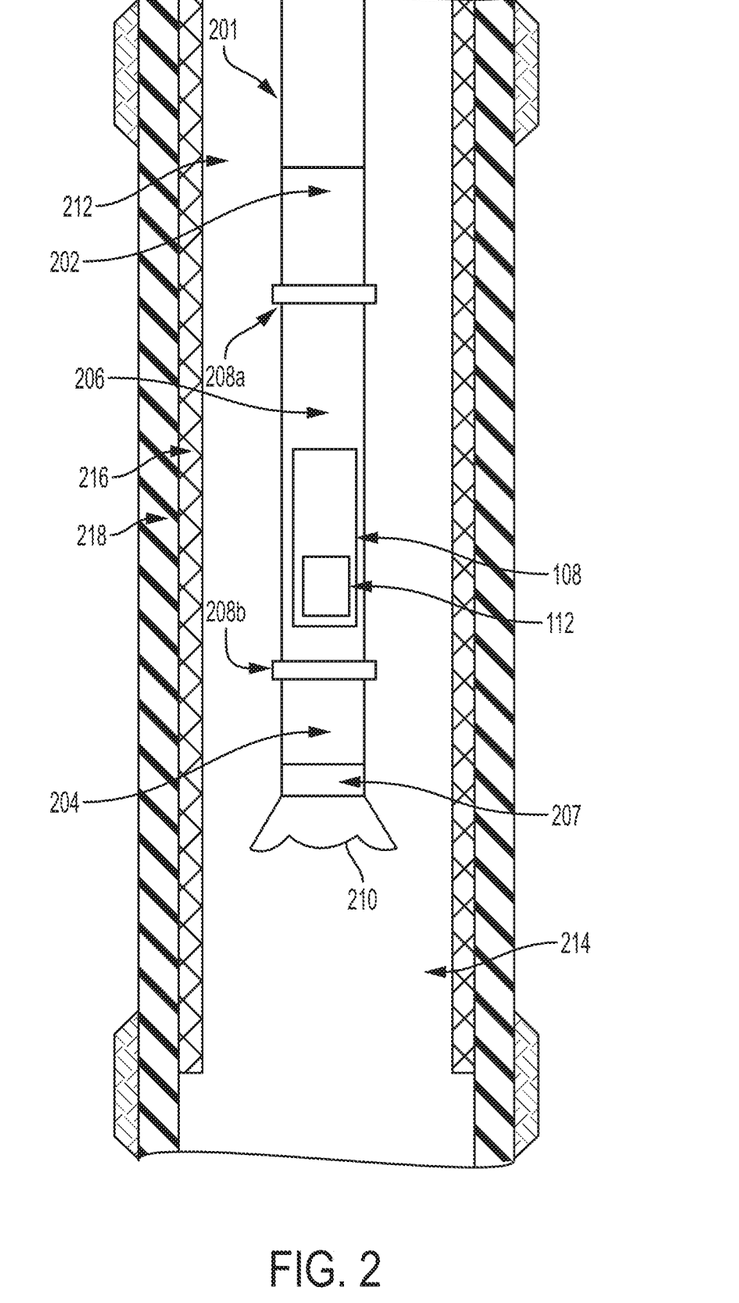
FIG. 2 is a cross-sectional view of an example of part of a well system that includes a downhole piezoelectric ultrasonic transducer according to some aspects of the present disclosure.

FIG. 2 is a cross-sectional view of an example of part of a well system that includes a downhole piezoelectric ultrasonic transducer according to some aspects. The well system includes a wellbore that has a casing string 216 and a cement sheath 218. In some examples, the wellbore can include fluid 214. The fluid 214 (e.g., mud) can flow in an annulus 212 positioned between the well tool 201 and a wall of the casing string 216.

A well tool 201 (e.g., logging-while-drilling tool) can be positioned in the wellbore. The well tool 201 can include various subsystems 202, 204, 206, 207. For example, the well tool 201 can include a subsystem 202 that includes a communication subsystem. The well tool 201 can also include a subsystem 204 that includes a saver subsystem or a rotary steerable system. A tubular section or an intermediate subsystem 206 (e.g., a mud motor or measuring-while-drilling module) can be positioned between the other subsystems 202, 204. In some examples, the well tool 201 can include a drill bit 210 for drilling the wellbore. The drill bit 210 can be coupled to another tubular section or intermediate subsystem 207 (e.g., a measuring-while-drilling module or a rotary steerable system). In some examples, the well tool 201 can also include tubular joints 208a, 208b.

The well tool 201 can include an ultrasonic sensing system 108. The ultrasonic sensing system 108 can be positioned anywhere in the well tool 201 for sensing characteristics of the wellbore. The ultrasonic sensing system 108 can use an ultrasonic transducer 112 to transmit ultrasonic waves. The ultrasonic waves can propagate through a medium, such as fluid 214 and reflect off one or more surfaces of the wellbore. The ultrasonic sensing system 108 can detect the reflected ultrasonic waves. The ultrasonic sensing system 108 can determine one or more characteristics of the wellbore based on the reflected ultrasonic waves.

Figure 3:
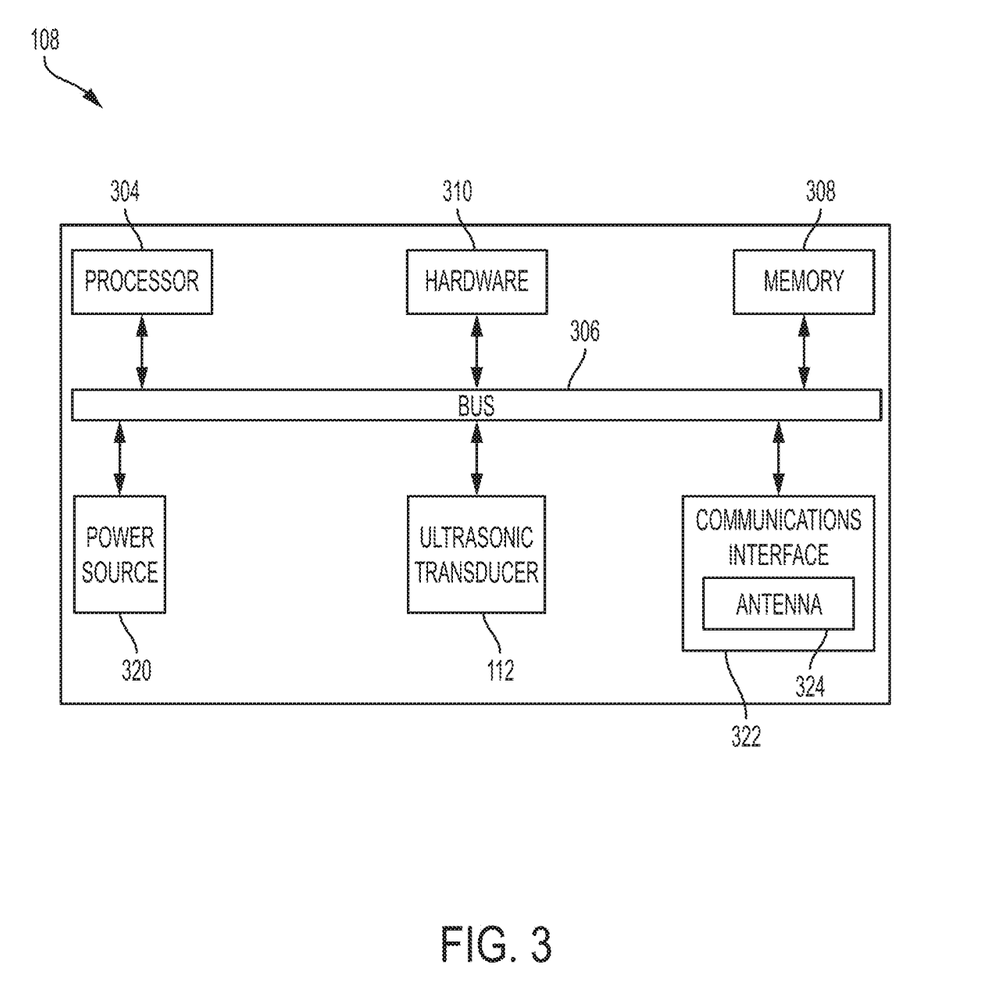
FIG. 3 is a block diagram of an example of an ultrasonic sensing system usable with a downhole piezoelectric ultrasonic transducer according to some aspects of the present disclosure.

FIG. 3 is a block diagram of an example of an ultrasonic sensing system 108 usable with a downhole piezoelectric ultrasonic transducer according to some aspects. In some examples, the components shown in FIG. 3 (e.g., the power source 320, ultrasonic transducer 112, communications interface 322, processor 304, memory 308, and hardware 310) can be integrated into a single structure. For example, the components can be within a single housing. In other examples, the components shown in FIG. 3 can be distributed (e.g., in separate housings) and in electrical communication with each other.

The ultrasonic sensing system 108 can include a processor 304, a memory 308, and a bus 306. The processor 304 can execute one or more operations for operating the ultrasonic sensing system 108. The processor 304 can execute instructions stored in the memory 308 to perform the operations. The processor 304 can include one processing device or multiple processing devices. Non-limiting examples of the processor 304 include a Field-Programmable Gate Array ("FPGA"), an application-specific integrated circuit ("ASIC"), a microprocessor, etc.

The processor 304 can be communicatively coupled to the memory 308 via the bus 306. The non-volatile memory 308 may include any type of memory device that retains stored information when powered off. Non-limiting examples of the memory 308 include electrically erasable and programmable read-only memory ("EEPROM"), flash memory, or any other type of non-volatile memory. In some examples, at least some of the memory 308 can include a medium from which the processor 304 can read instructions. A computer-readable medium can include electronic, optical, magnetic, or other storage devices capable of providing the processor 304 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which the processor 304 can read instructions. The instructions can include processor-specific instructions generated by a compiler or an interpreter from code written in any suitable computer-programming language, including, for example, C, C++, C#, etc.

The ultrasonic sensing system 108 can include a power source 320. In some examples, the power source 320 can include a battery or a thermal electric generator (e.g., for powering the ultrasonic sensing system 108). In other examples, the power source 320 can include an electrical cable (e.g., a wireline) electrically coupled to the ultrasonic sensing system 108.

The ultrasonic sensing system 108 can include a communications interface 322. The communications interface 322 can include a wired interface or a wireless interface (which can include an antenna 324). In some examples, part of the communications interface 322 can be implemented in software. For example, the communications interface 322 can include instructions stored in memory 308.

The ultrasonic sensing system 108 can use the communications interface to communicate with one or more external devices. In some examples, the communications interface 322 can amplify, filter, demodulate, demultiplex, demodulate, frequency shift, and otherwise manipulate a signal received from an external device. The communications interface 322 can transmit a signal associated with the received signal to the processor 304 or the hardware 310. The processor 304 or hardware 310 can receive and analyze the signal to retrieve data associated with the received signal.

In some examples, the ultrasonic sensing system 108 can analyze the data from the communications interface 322 and perform one or more functions. For example, the ultrasonic sensing system 108 can generate a response based on the data. The ultrasonic sensing system 108 (e.g., the processor 304) can cause a response signal associated with the response to be transmitted to the communications interface 322. The communications interface 322 can generate a transmission signal (e.g., via the antenna 324) to communicate the response to a remote electronic device. For example, the communications interface 322 can amplify, filter, modulate, frequency shift, multiplex, and otherwise manipulate the response signal to generate the transmission signal. In some examples, the communications interface 322 can encode data within the response signal using a modulation technique (e.g., frequency modulation, amplitude modulation, or phase modulation) to generate the transmission signal. The communications interface 322 can transmit the transmission signal to the antenna 324. The antenna 324 can receive the transmission signal and responsively generate a wireless communication. In this manner, the ultrasonic sensing system 108 can receive, analyze, and respond to communications from an external electronic device.

In some examples, the ultrasonic transducer 112 can transmit ultrasonic signals and detect refracted or reflected ultrasonic waves. In some examples, the ultrasonic transducer 112 is, or includes, an ultrasonic sensor. In such an example, the ultrasonic transducer 112 may be able to generate ultrasonic waves and detect ultrasonic waves. For example, the ultrasonic sensing system 108 can use the ultrasonic transducer 112 to generate ultrasonic waves. The ultrasonic sensing system 108 can also use the ultrasonic transducer 112 to detect ultrasonic waves, e.g., propagating through a wellbore.

In other examples, the ultrasonic transducer 112 can transmit ultrasonic signals and a separate ultrasonic sensor can detect ultrasonic waves. For example, the ultrasonic sensor can detect reflections of ultrasonic waves or refractions of ultrasonic waves propagating through a wellbore. Examples of the ultrasonic sensor can include a microphone or a hydrophone. A hydrophone can detect ultrasonic waves propagating through a liquid medium.

The ultrasonic transducer 112 (or the ultrasonic sensor, if included) can transmit data to the processor 304, the hardware 310, or both. The processor 304 or hardware 310 can perform one or more functions based on the data, communicate the data (via the communications interface 322) to an external electronic device, or both.

In some examples, the ultrasonic sensing system 108 can include multiple ultrasonic sensors. The ultrasonic sensors can be arranged in an array. The ultrasonic sensors and transmit data to the processor 304, the hardware 310, or both.

The ultrasonic transducer 112 can receive electrical signals and responsively generate ultrasonic waves. In some examples, the ultrasonic transducer 112 includes a rear layer attached to backing material, in addition to including piezoelectric material and a front layer. The layers of the ultrasonic transducer 112 can be affixed to one another using a bonding substance (e.g., epoxy or glue).

The ultrasonic sensing system 108 can include other hardware 310. Examples of hardware 310 can include a processor, transistor, resistor, capacitor, inductor, integrated circuit component, a memory device, an operational amplifier, a tube, a comparator, a timing device, or any combination of these. In some examples, the hardware 310 can replace the functions of the processor 304, the memory 308, or both. For example, the hardware 310 can include any suitable combination of electrical components for operating ultrasonic transducer 112, communications interface 322, or any combination of these.

In some examples, the ultrasonic sensing system 108 can include more, fewer, or different components than those shown in FIG. 3. Additionally or alternatively, the components of the ultrasonic sensing system 108 can be configured differently than the configuration shown in FIG. 3. For example, the ultrasonic sensing system 108 may not include the processor 304, memory 308, or both. In such an example, the ultrasonic transducer 112 and communications interface 322 may be configured to directly communicate with one another or to communicate via bus 306. For example, the ultrasonic transducer 112 can be configured to directly communicate data to the communications interface 322 for wireless transmission. In some examples, the power source 320 can directly communicate with the ultrasonic transducer 112. For example, the power source 320 can directly transmit electrical signals to the ultrasonic transducer 112 to operate the ultrasonic transducer.

Figure 4:
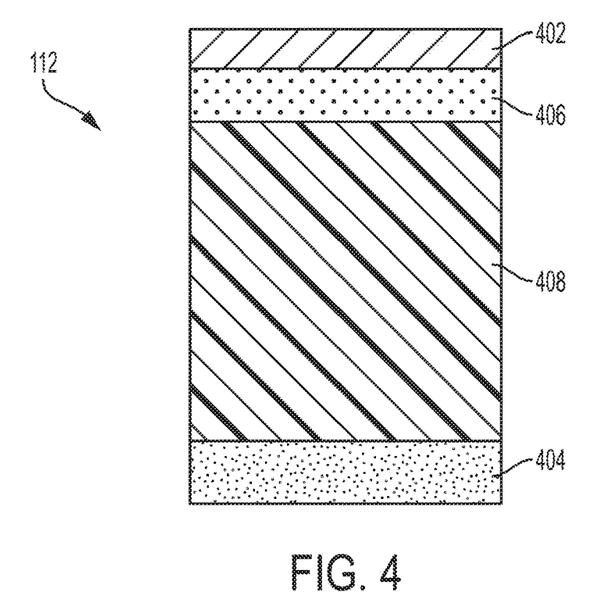
FIG. 4 is a cross-sectional side view of a downhole piezoelectric ultrasonic transducer according to some aspects of the present disclosure.

FIG. 4 is a cross-sectional side view of a downhole piezoelectric ultrasonic transducer 112 according to some aspects of the present disclosure. The ultrasonic transducer 112 includes a front layer 402 and a rear layer 404. Between the front layer 402 and the rear layer 404 are piezoelectric material 406 and backing material 408. The backing material 408 is coupled to the rear layer 404, and the piezoelectric material 406 is coupled to the front layer 402 and to the backing material 408. An example of the backing material is rubber mixed with tungsten or a similar substance, in powder form, for example. Other examples of the backing material 408 include an epoxy with silver, silver composite, or similar material added.

Each of the front layer 402 and the rear layer 404 can be a quarter-wavelength plate. The rear layer 404 can be made with a material that has an ultrasonic impedance between the backing material 408 and the medium behind the transducer 112. For example, material from Insulcast® can be used for the rear layer 404. The wavelength of the material for the rear layer 404 can be calculated by dividing the sound of speed by working frequency. For example, a material with sound of speed about 2500 m/s, at 200 kHz, its wavelength is 12.5 mm. A quarter wavelength in that example is 12.5 divided by 4, or 3.125 mm.

Figure 5:
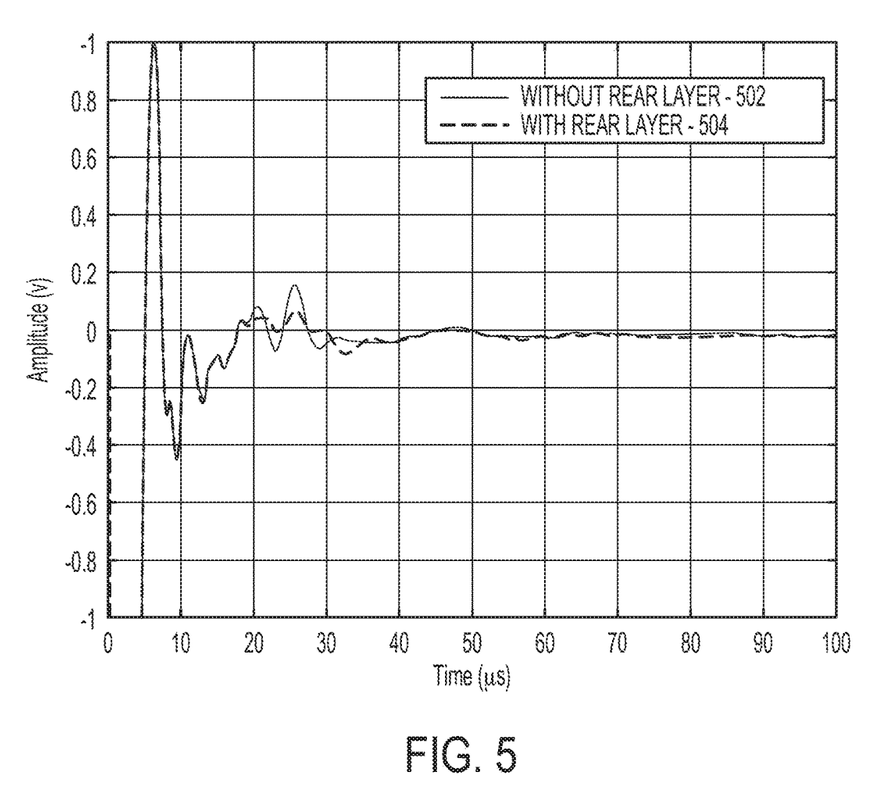
FIG. 5 is a graph depicting an example of amplitudes of ultrasonic waves output by an ultrasonic transducer according to one example and an ultrasonic transducer with only backing material behind piezoelectric material according to some aspects of the present disclosure.

The rear layer 404 can absorb and attenuate signals from the piezoelectric material 406 to reduce noise from the transducer that otherwise inhibits signal processing of detected signals from the transducer 112, and to improve SNR. FIG. 5 is a graph depicting an example of amplitudes of ultrasonic waves output by an ultrasonic transducer according to one example and an ultrasonic transducer with only backing material behind piezoelectric material according to some aspects of the present disclosure. Line 502 represents the amplitude response of a transducer without a rear layer and line 504 represents the amplitude response of a transducer with a rear layer.

The free-field signal of the transducer without the rear layer was measured in water by using a square pulse excitation. Free-field measurement involves the condition in which there is no any reflector in front of the transducer. The square pulse was of −100 V in amplitude, and of 5 microsecond in width. The received signal shown by line 502 has the excitation start at about 0 μs. The signal shows a clear wavelet between 20 to 30 μs. This wavelet is the reflection from the bottom of the backing material. But reflection can superpose onto the signal received from the front surface of the piezoelectric material when there is target inducing reflection in the front of the transducer. The desired signal is contaminated, posing difficulty in downhole imaging or caliper applications.

The transducer with the rear layer included a plate having a thickness of about 3 mm molded onto the backing material of the transducer, to form a rear quarter-wavelength plate. The free-field signal represented by line 504 was captured in the same medium (water) and on the same excitation condition. The wavelet between 20 to 30 μs is significantly subdued and the self noise of the transducer is much smaller.

Figure 6:
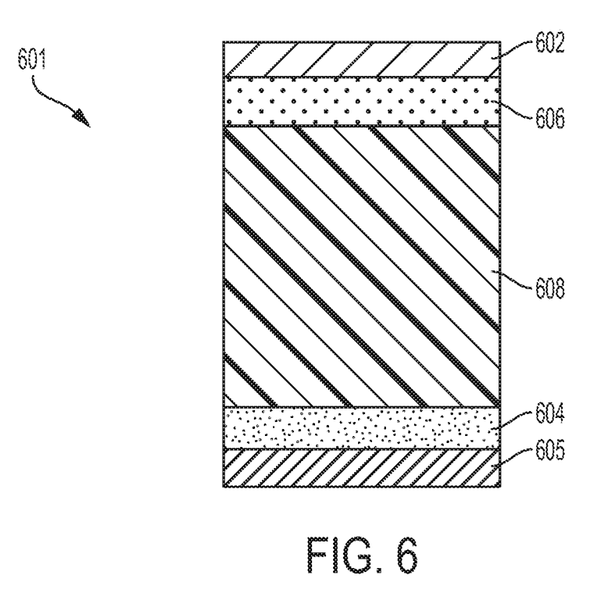
FIG. 6 is a cross-sectional side view of a downhole piezoelectric ultrasonic transducer with an additional rear layer according to some aspects of the present disclosure.

FIG. 6 is a cross-sectional side view of a downhole piezoelectric ultrasonic transducer 601 with an additional rear layer 605 according to some aspects of the present disclosure. The transducer 601 includes a front layer 602, a first rear layer 604, and a second rear layer 605. Attached to the front layer 602 is piezoelectric material 606. Positioned between the piezoelectric material 606 and the first rear layer 604 is backing material 608.

More than one layer can be attached to the bottom of the backing material 608 to facilitate the ultrasound signals transmitting from the backing material 608 into the medium behind the transducer 601. The better the transmission to the medium is, the less reflection from the bottom of the backing material 608. The first rear layer 604 closest to the bottom of the backing material can have the ultrasonic impedance between those of the backing material 608 and the material of the second rear layer 605. The second rear layer 605 can have the ultrasonic impedance between those of the first rear layer 604 and the medium behind the transducer 601.

In some aspects, systems, devices, and methods for a transducer with improved SNR are provided according to one or more of the following examples:

Example 1 is a well tool usable in a wellbore, the well tool comprising: an ultrasonic transducer for generating an ultrasonic wave in a medium of the wellbore, the ultrasonic transducer comprising: a front layer; a rear layer; backing material coupled to the rear layer; and piezoelectric material coupled to the front layer and to the backing material.

Example 2 is the well tool of example 1, wherein the rear layer is a rear quarter-wavelength plate.

Example 3 is the well tool of example 2, wherein the front layer is a front quarter-wavelength plate.

Example 4 is the well tool of example 1, wherein the ultrasonic transducer is an ultrasound ultrasonic transducer for outputting the ultrasonic wave at a frequency of 20 kHz or higher.

Example 5 is the well tool of example 1, wherein the well tool comprises a logging-while-drilling tool or a wireline tool.

Example 6 is the well tool of example 1, further comprising: an ultrasonic sensor for detecting a reflection or a refraction of the ultrasonic wave off an object in the wellbore and transmitting an associated signal; a processing device in communication with the ultrasonic transducer and the ultrasonic sensor; and a memory device in which instructions are stored that are executable by the processing device for causing the processing device to: receive the associated signal from the ultrasonic sensor; and determine a characteristic of the object based on the associated signal.

Example 7 is the well tool of example 6, wherein the characteristic is an image of the object.

Example 8 is the well tool of example 6, wherein the characteristic is a measured diameter of part of the wellbore determined by a caliper application, an impedance of borehole material, or an existence of a deformity of a wall of the borehole wall.

Example 9 is a sensor system for use in a wellbore, the sensor system comprising: an ultrasonic transducer for generating an ultrasonic wave in a medium of the wellbore, the ultrasonic transducer comprising: a front layer; a rear layer; backing material coupled to the rear layer; and piezoelectric material coupled to the front layer and to the backing material; a hydrophone for detecting a reflection or a refraction of the ultrasonic wave off an object in the wellbore and transmitting an associated signal to a processing device.

Example 10 is the sensor system of example 9, wherein the rear layer is a rear quarter-wavelength plate and the front layer is a front quarter-wavelength plate.

Example 11 is the sensor system of example 9, wherein the ultrasonic transducer is an ultrasound ultrasonic transducer for outputting the ultrasonic wave at a frequency of 20 kHz or higher.

Example 12 is the sensor system of example 9, wherein the sensor system is in a logging-while-drilling tool or a wireline tool.

Example 13 is the sensor system of example 9, further comprising: the processing device in communication with the ultrasonic transducer and the hydrophone; and a memory device in which instructions are stored that are executable by the processing device for causing the processing device to: receive the associated signal from the hydrophone; and determine a characteristic of the object based on the associated signal.

Example 14 is the sensor system of example 13, wherein the characteristic is an image of the object.

Example 15 is the sensor system of example 13, wherein the characteristic is a measured diameter of part of the wellbore determined by a caliper application, an impedance of borehole material, or an existence of a deformity of a wall of the borehole wall.

Example 16 is a method, comprising; disposing a well tool in a wellbore, the well tool including a hydrophone and an ultrasonic transducer, the ultrasonic transducer including a front layer, a rear layer, backing material coupled to the rear layer, and piezoelectric material coupled to the front layer and to the backing material; outputting, by the ultrasonic transducer, an ultrasonic wave in a medium of the wellbore; detecting, by the hydrophone, a reflection or a refraction of the ultrasonic wave off an object in the wellbore; generating, by the hydrophone, a representative signal of the reflection or the refraction of the ultrasonic wave off the object in the wellbore; and using the representative signal to determine a characteristic of the object.

Example 17 is the method of example 16, wherein the rear layer is a rear quarter-wavelength plate and the front layer is a front quarter-wavelength plate, wherein the ultrasonic transducer is an ultrasound ultrasonic transducer for outputting the ultrasonic wave at a frequency of 20 kHz or higher.

Example 18 is the method of example 16, wherein the well tool is a logging-while-drilling tool or a wireline tool.

Example 19 is the method of example 16, wherein the characteristic is an image of the object.

Example 20 is the method of example 16, wherein the characteristic is a measured diameter of part of the wellbore determined by a caliper application, an impedance of borehole material, or an existence of a deformity of a wall of the borehole wall.

Example 21 is a well tool usable in a wellbore, the well tool comprising: an ultrasonic transducer for generating an ultrasonic wave in a medium of the wellbore, the ultrasonic transducer comprising: a front layer; a rear layer; backing material coupled to the rear layer; and piezoelectric material coupled to the front layer and to the backing material.

Example 22 is the well tool of example 21, wherein the rear layer is a rear quarter-wavelength plate.

Example 23 is the well tool of examples 21 or 22, wherein the front layer is a front quarter-wavelength plate.

Example 24 is the well tool of any of examples 21 to 23, wherein the ultrasonic transducer is an ultrasound ultrasonic transducer for outputting the ultrasonic wave at a frequency of 20 kHz or higher.

Example 25 is the well tool of any of examples 21 to 24, wherein the well tool comprises a logging-while-drilling tool or a wireline tool.

Example 26 is the well tool of any of examples 21 to 25, further comprising: an ultrasonic sensor for detecting a reflection or a refraction of the ultrasonic wave off an object in the wellbore and transmitting an associated signal; a processing device in communication with the ultrasonic transducer and the ultrasonic sensor; and a memory device in which instructions are stored that are executable by the processing device for causing the processing device to: receive the associated signal from the ultrasonic sensor; and determine a characteristic of the object based on the associated signal.

Example 27 is the well tool of example 26, wherein the characteristic is an image of the object.

Example 28 is the well tool of example 26, wherein the characteristic is a measured diameter of part of the wellbore determined by a caliper application, an impedance of borehole material, or an existence of a deformity of a wall of the borehole wall.

Example 29 is the well tool of any of examples 21 to 28, wherein the well tool is in a sensor system for use in the wellbore, the sensor system comprising: a hydrophone for detecting a reflection or a refraction of the ultrasonic wave off an object in the wellbore and transmitting an associated signal to a processing device.

Example 30 is the sensor system of example 29, wherein the sensor system is in a logging-while-drilling tool or a wireline tool.

Example 31 is a method, comprising; disposing a well tool in a wellbore, the well tool including a hydrophone and an ultrasonic transducer, the ultrasonic transducer including a front layer, a rear layer, backing material coupled to the rear layer, and piezoelectric material coupled to the front layer and to the backing material; outputting, by the ultrasonic transducer, an ultrasonic wave in a medium of the wellbore; detecting, by the hydrophone, a reflection or a refraction of the ultrasonic wave off an object in the wellbore; generating, by the hydrophone, a representative signal of the reflection or the refraction of the ultrasonic wave off the object in the wellbore; and using the representative signal to determine a characteristic of the object.

Example 32 is the method of example 31, wherein the rear layer is a rear quarter-wavelength plate and the front layer is a front quarter-wavelength plate, wherein the ultrasonic transducer is an ultrasound ultrasonic transducer for outputting the ultrasonic wave at a frequency of 20 kHz or higher.

Example 33 is the method of any of examples 31 to 32, wherein the well tool is a logging-while-drilling tool or a wireline tool.

Example 34 is the method of any of examples 31 to 33, wherein the characteristic is an image of the object.

Example 35 is the method of any of examples 31 to 33, wherein the characteristic is a measured diameter of part of the wellbore determined by a caliper application, an impedance of borehole material, or an existence of a deformity of a wall of the borehole wall.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A well tool usable in a wellbore, the well tool comprising:
   an ultrasonic transducer for generating an ultrasonic wave in an acoustic medium of the wellbore, the ultrasonic transducer comprising:
      a front layer;
      a piezoelectric layer comprising a first side and a second side, the front layer coupled to the first side of the piezoelectric layer;
      a backing layer comprising a first side and a second side, the second side of the piezoelectric layer coupled to the first side of the backing layer; and
      a rear layer comprising:
         a first side coupled to the second side of the backing layer;
         a second side of the rear layer positionable to abut the acoustic medium; and
         a thickness between the first side and the second side that is one-fourth of a wavelength of a velocity of sound in a material of the rear layer.

2. The well tool of claim 1, wherein the front layer is a front quarter-wavelength plate.

3. The well tool of claim 1, wherein the ultrasonic transducer is an ultrasound ultrasonic transducer for outputting the ultrasonic wave at a frequency of 20 kHz or higher.

4. The well tool of claim 1, wherein the well tool comprises a logging-while-drilling tool or a wireline tool.

5. The well tool of claim 1, further comprising:
   an ultrasonic sensor for detecting a reflection or a refraction of the ultrasonic wave off an object in the wellbore and transmitting an associated signal;
   a processing device in communication with the ultrasonic transducer and the ultrasonic sensor; and
   a memory device in which instructions are stored that are executable by the processing device for causing the processing device to:
      receive the associated signal from the ultrasonic sensor; and
      determine a characteristic of the object based on the associated signal.

6. The well tool of claim 5, wherein the characteristic is an image of the object.

7. The well tool of claim 5, wherein the characteristic is a measured diameter of part of the wellbore determined by a caliper application, an impedance of borehole material, or an existence of a deformity of a wall of the wellbore.

8. A sensor system for use in a wellbore, the sensor system comprising:
   an ultrasonic transducer for generating an ultrasonic wave in an acoustic medium of the wellbore, the ultrasonic transducer comprising:
      a front layer;
      a piezoelectric layer comprising a first side and a second side, the front layer coupled to the first side of the piezoelectric layer;
      a backing layer comprising a first side and a second side, the second side of the piezoelectric layer coupled to the first side of the backing layer; and
      a rear layer comprising:
         a first side coupled to the second side of the backing layer;
         a second side of the rear layer positionable to abut the acoustic medium; and
         a thickness between the first side and the second side that is one-fourth of a wavelength of a velocity of sound in a material of the rear layer; and
   a hydrophone for detecting a reflection or a refraction of the ultrasonic wave off an object in the wellbore and transmitting an associated signal to a processing device.

9. The sensor system of claim 8, wherein the ultrasonic transducer is an ultrasound ultrasonic transducer for outputting the ultrasonic wave at a frequency of 20 kHz or higher.

10. The sensor system of claim 8, wherein the sensor system is in a logging-while-drilling tool or a wireline tool.

11. The sensor system of claim 8, further comprising:
    the processing device in communication with the ultrasonic transducer and the hydrophone; and
    a memory device in which instructions are stored that are executable by the processing device for causing the processing device to:
       receive the associated signal from the hydrophone; and
       determine a characteristic of the object based on the associated signal.

12. The sensor system of claim 11, wherein the characteristic is an image of the object.

13. The sensor system of claim 11, wherein the characteristic is a measured diameter of part of the wellbore determined by a caliper application, an impedance of borehole material, or an existence of a deformity of a wall of the wellbore.

14. A method, comprising;
    disposing a well tool in a wellbore, the well tool including a hydrophone and an ultrasonic transducer, the ultrasonic transducer comprising:
       a front layer;
       a piezoelectric layer comprising a first side and a second side, the front layer coupled to the first side of the piezoelectric layer;
       a backing layer comprising a first side and a second side, the second side of the piezoelectric layer coupled to the first side of the backing layer; and
       a rear layer comprising:
          a first side coupled to the second side of the backing layer;
          a second side of the rear layer positioned to abut an ultrasonic medium of the wellbore; and
          a thickness between the first side and the second side that is one-fourth of a wavelength of a velocity of sound in a material of the rear layer;
    outputting, by the ultrasonic transducer, an ultrasonic wave in the ultrasonic medium of the wellbore;
    detecting, by the hydrophone, a reflection or a refraction of the ultrasonic wave off an object in the wellbore;
    generating, by the hydrophone, a representative signal of the reflection or the refraction of the ultrasonic wave off the object in the wellbore; and
    using the representative signal to determine a characteristic of the object.

15. The method of claim 14, wherein the front layer is a front quarter-wavelength plate,
wherein the ultrasonic transducer is an ultrasound ultrasonic transducer for outputting the ultrasonic wave at a frequency of 20 kHz or higher.

16. The method of claim 14, wherein the well tool is a logging-while-drilling tool or a wireline tool.

17. The method of claim 14, wherein the characteristic is an image of the object.

18. The method of claim 14, wherein the characteristic is a measured diameter of part of the wellbore determined by a caliper application, an impedance of borehole material, or an existence of a deformity of a wall of the wellbore.

\* \* \* \* \*